(12) United States Patent
Aoki et al.

(10) Patent No.: US 7,958,297 B2
(45) Date of Patent: Jun. 7, 2011

(54) CARD-TYPE PERIPHERAL DEVICE

(75) Inventors: Yoshitaka Aoki, Kanagawa (JP); Keiichi Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 12/229,773

(22) Filed: Aug. 27, 2008

(65) Prior Publication Data

US 2009/0063743 A1 Mar. 5, 2009

(30) Foreign Application Priority Data

Aug. 31, 2007 (JP) ................................. 2007-227207

(51) Int. Cl.
H05K 7/10 (2006.01)
G06F 13/00 (2006.01)
(52) U.S. Cl. ........................................ 710/301; 711/115
(58) Field of Classification Search .................. 710/301, 710/302, 105, 306, 313; 439/945, 946, 188, 439/488, 489; 711/115; 365/189.011; 361/737
See application file for complete search history.

(56) References Cited

U.S. PATENT DOCUMENTS

| | | | | |
|---|---|---|---|---|
| 5,155,663 A * | 10/1992 | Harase | ...................... | 361/679.31 |
| 5,548,741 A * | 8/1996 | Watanabe | ...................... | 711/115 |
| 6,219,256 B1 * | 4/2001 | Wu | ................ | 361/801 |
| 6,382,995 B1 | 5/2002 | Bricaud et al. | | |
| 6,524,137 B1 * | 2/2003 | Liu et al. | ......................... | 439/638 |
| 6,709,281 B2 * | 3/2004 | Shishikura et al. | ........... | 439/188 |
| 6,739,515 B1 * | 5/2004 | Wallace | .......................... | 235/492 |
| 6,994,263 B2 * | 2/2006 | Ueda et al. | ...................... | 235/492 |
| 7,123,511 B2 * | 10/2006 | Newell | ...................... | 365/185.04 |
| 7,136,951 B2 * | 11/2006 | Deng et al. | ...................... | 710/302 |
| 7,189,118 B2 * | 3/2007 | Lee | ................. | 439/630 |
| 7,314,388 B2 * | 1/2008 | Yamada et al. | ................ | 439/630 |
| 7,412,553 B2 * | 8/2008 | Morrow | ........................ | 710/305 |
| 2005/0138288 A1 | 6/2005 | Chou et al. | | |
| 2005/0258243 A1 | 11/2005 | Hsieh | | |
| 2008/0071963 A1 | 3/2008 | Chow et al. | | |
| 2009/0013134 A1 * | 1/2009 | Chen et al. | ...................... | 711/152 |
| 2009/0061688 A1 | 3/2009 | Aoki et al. | | |
| 2009/0077295 A1 | 3/2009 | Konno et al. | | |

FOREIGN PATENT DOCUMENTS

| | | |
|---|---|---|
| JP | 04-124790 A | 4/1992 |
| JP | 10-334206 A | 12/1998 |
| JP | 2002-517834 T | 6/2002 |
| JP | 2005-050280 A | 2/2005 |
| JP | 2005-284323 A | 10/2005 |
| JP | 2006-106826 A | 4/2006 |
| JP | 2006-185677 A | 7/2006 |

OTHER PUBLICATIONS

PCMCIA: "The ExpressCard™ Standard—The Next Generation PC Card Technology" Oct. 2003, Retrieved from the Internet: URL: http://www.expresscard.org/files/ExpressCardWP.pdf, [retrieved on Aug. 9, 2005].
Nikkei Electronics, Jun. 9, 2003, pp. 67-76.

* cited by examiner

*Primary Examiner* — Mark Rinehart
*Assistant Examiner* — Trisha Vu
(74) *Attorney, Agent, or Firm* — Wolf, Greenfield & Sacks, P.C.

(57) ABSTRACT

A card-type peripheral device includes an electronic component including a memory disposed in a case, a terminal part including connection terminals connectable with a to-be-connected device, and a switch for disabling writing to the memory. The card-type peripheral device further includes a signal terminal capable of transmitting a signal indicating the status of the switch to the to-be-connected device.

16 Claims, 18 Drawing Sheets

FIG. 1A    (Prior Art)
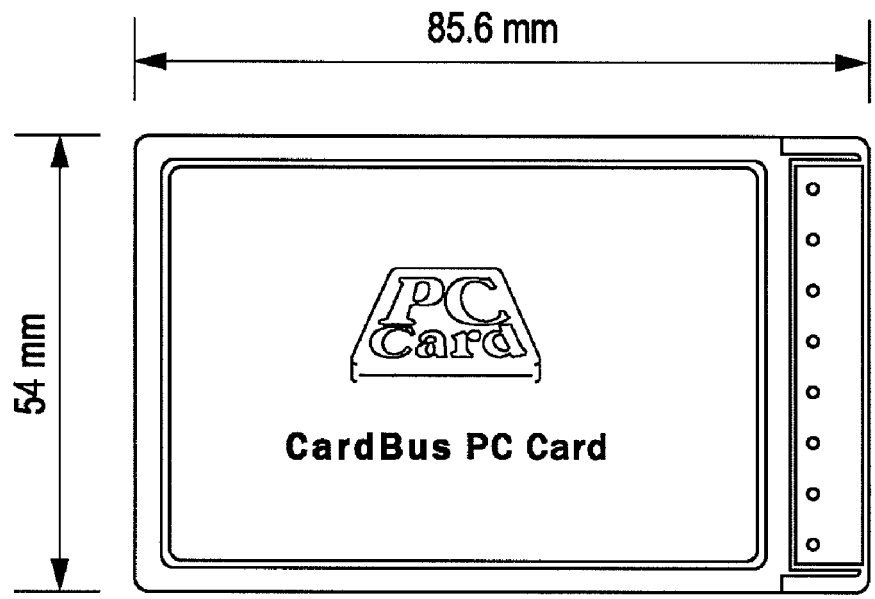
FIG. 1B    (Prior Art)
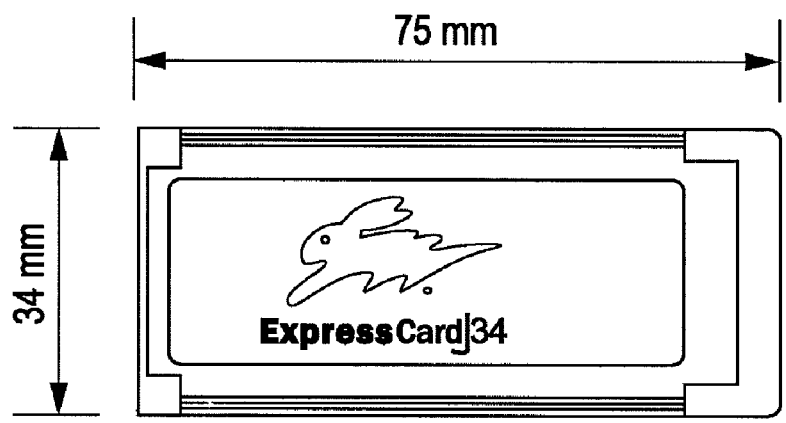

FIG. 5

PIN ASSIGNMENTS

| Pin | Name | Usage | Input/Output |
|---|---|---|---|
| 26 | GND | GND | |
| 25 | PETp0 | PCI Express Transmitter (Host) positive | I |
| 24 | PETn0 | PCI Express Transmitter (Host) negative | I |
| 23 | GND | GND | |
| 22 | PERp0 | PCI Express Receiver (Host) positive | O |
| 21 | PERn0 | PCI Express Receiver (Host) negative | O |
| 20 | GND | GND | |
| 19 | REFCLK+ | PCI Express Reference Clock positive | I |
| 18 | REFCLK- | PCI Express Reference Clock negative | I |
| 17 | CPPE# | PCI Express Module Presence Bar | O |
| 16 | CLKREQ# | PCI Express Clock Request Bar | O |
| 15 | +3.3V | +3.3V Voltage Source | |
| 14 | +3.3V | +3.3V Voltage Source | |
| 13 | PERST# | PCI Express Reset Bar | I |
| 12 | +3.3VAUX | Undefined | |
| 11 | WAKE# | Undefined | |
| 10 | +1.5V | +1.5V Voltage Source | |
| 9 | +1.5V | +1.5V Voltage Source | |
| 8 | SMBDATA | Undefined | |
| 7 | SMBCLK | Undefined | |
| 6 | RESERVED | NC | |
| 5 | RESERVED | NC | |
| 4 | CPUSB# | Undefined | |
| 3 | USBD+ | Undefined | |
| 2 | USBD- | Undefined | |
| 1 | GND | GND | |

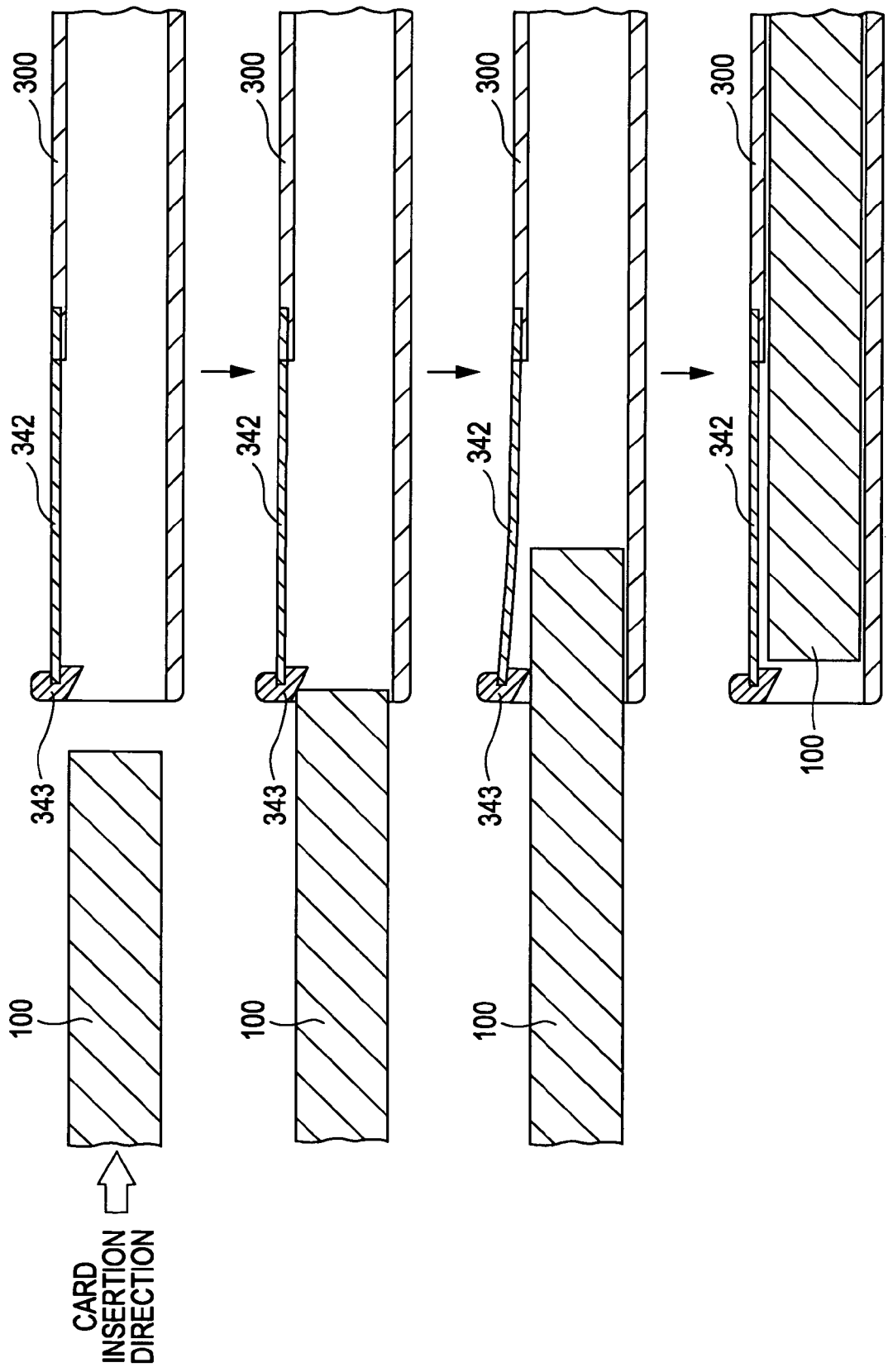

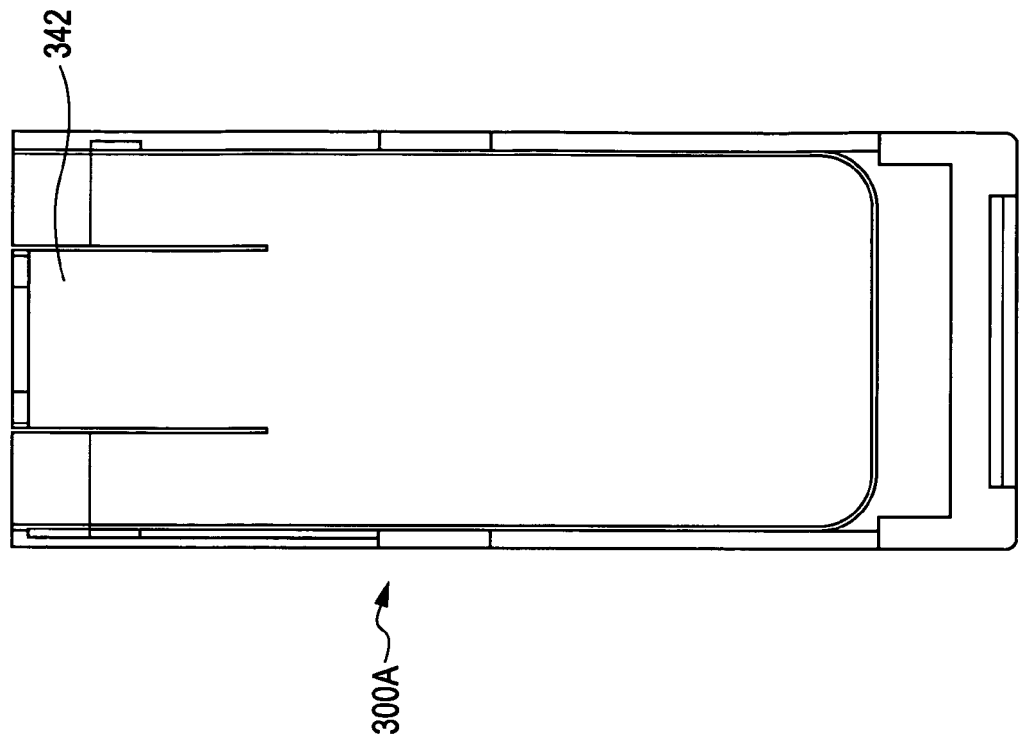
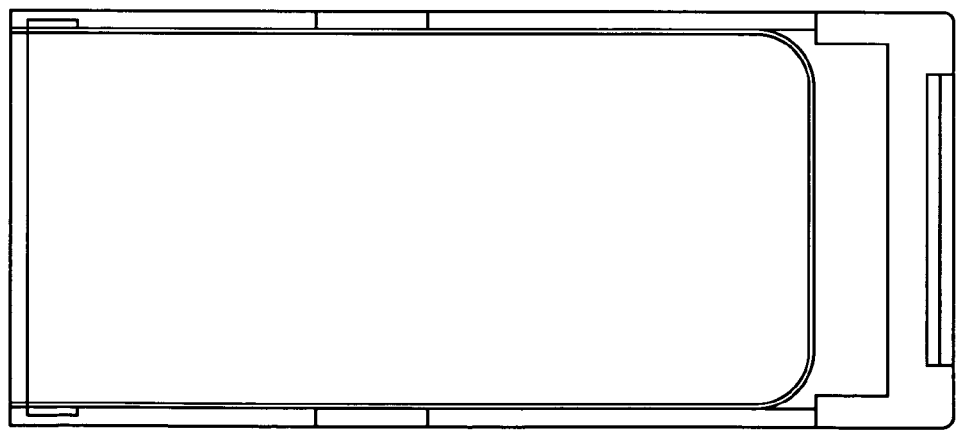

CARD-TYPE PERIPHERAL DEVICE

CROSS REFERENCES TO RELATED APPLICATIONS

The present invention contains subject matter related to Japanese Patent Application JP 2007-227207 filed in the Japanese Patent Office on Aug. 31, 2007, the entire contents of which are incorporated herein by reference.

BACKGROUND OF THE INVENTION

1. Field of the Invention

The present invention relates to a card-type peripheral device such as a memory card.

2. Description of the Related Art

In a related art, there is a card-type peripheral device called a PC card used in a state in which it is inserted in a card slot of a personal computer or the like. In recent years, a reduction in size and an increase in operating speed of personal computers have been achieved. In order to adapt to such an advance, ExpressCard (known as NEWCARD before) has been proposed as a card-type peripheral device that is smaller in outside dimensions than the PC card and that can transfer data at a high rate (see, for example, "New standard 'NEWCARD' allows a reduction in size and an increase in operating speed of PC cards, which will lead to a further advance in personal computers" (Nikkei Electronics, Jun. 9, 2003, pp. 67-76)).

The ExpressCard is intended to be used instead of PC cards (PCMCIA) that are currently in wide use. The ExpressCard uses a PCI Express interface that is an interface according to a new I/O bus standard intended to be an alternative to a PCI bus. Compared with other cards currently used, the interface for the ExpressCard can operate at a much higher speed. Thus, when a nonvolatile memory is installed in this card so that the card functions as a memory card, the resultant memory card can write/read data at a very high rate.

Because of its high performance and usability, ExpressCard is expected to be used in a wide variety of devices such as a digital camera, a portable telephone device, a PDA (Personal Digital Assistants) device, a music player, etc.

SUMMARY OF THE INVENTION

However, as shown in FIGS. 1A and 1B, this card has outside dimensions of 75 mm in length, 34 mm in width, and 5 mm in thickness, which are not small enough to be used in small-size electronic devices such as a portable telephone device, an information terminal device, a digital still camera, etc., although the dimensions are smaller than those of the PC card currently used. That is, the not-small-enough dimensions of the ExpressCard are disadvantageous when the card is installed in a small-size electronic device. Thus, there is a need for a new card-type peripheral device that is smaller in outside dimensions than the ExpressCard and that can be installed in an ExpressCard slot.

Memory cards with a still smaller size are available for use in electronic devices such as portable telephone devices, information terminal devices, digital still cameras, etc. Such small-size memory cards are usable not only in small-size electronic devices but also usable in rather-large-size external devices such as personal computers (PCs) having a slot for receiving the small-size memory card. However, at present, it is difficult to use small-size memory cards in devices originally designed for use with standard ExpressCard. In view of the above, there is a need for a new card-type peripheral device having an adapter function that allows a small-size memory card to be used in a device originally designed for use with ExpressCard.

Some small-size memory cards have a switch for disabling writing information to cards and deleting information stored in the cards thereby to protect information from being deleted by mistake. The switch operates according to one of two techniques described below.

In a first technique, as shown in FIGS. 2A and 2B, the status of a switch 2 is detected by a controller 3 disposed in a card 1, and disabling of writing/deleting is performed internally in the card 1. Information indicating the status of the switch 2 is supplied to a host device that is not shown in the figures.

In a second technique, as shown in FIGS. 3A and 3B, the status of the switch 2 is detected by an external detection device such as a connector disposed in a host device, and writing/deleting of information to/from the card 1 is controlled not directly in the card 1 but by the host device.

In both types of cards, a problem can occur when a card is inserted into the adapter described above. In the case of the first type card, to change the position of the switch, it is necessary to pull the card out of the adapter. That is, it is necessary to first pull the adapter out of the host device and then the card out of the adapter. In view of the above, priority is given to convenience in pulling the card out of the adapter, i.e., the adapter is configured so that the card can be easily pulled out.

In the case of the second type card, when the adapter has a switch for enabling/disabling writing/deleting of information, the state of the switch disposed on the card is ignored. This produces a possibility that the intention of a user as to whether writing/deleting is enabled or disabled is not reflected. To avoid the above problem, a delete protection switch is not generally disposed on the adapter, as with the adapter for the first type card. In view of the above, the present invention provides a card-type peripheral device realized in a small form, having a switch for disabling writing/deleting of information to/from the card, and having a function of providing information indicating the status of the switch to the outside thereby allowing a host device to handle the card in an efficient manner.

According to an embodiment of the present invention, there is provided a card-type peripheral device including an electronic component including a memory disposed in a case, a terminal part including connection terminals connectable with a to-be-connected device, and a switch for disabling writing to the memory, wherein the card-type peripheral device further includes a signal terminal capable of transmitting a signal indicating the status of the switch to the to-be-connected device.

A function of the electronic component and the number of terminals of the terminal part may be maintained to be compatible with those of the to-be-connected device.

The signal terminal may be realized by one of the connection terminals of the terminal part.

The electronic component may include a controller adapted to control the operation of the electronic component so as to disable writing of information to the memory and deleting of information stored in the memory depending on the status of the switch.

The controller may control the signal terminal level depending on the status of the switch. The card-type peripheral device may further include a card adapter capable of being connected with the terminal part and capable of being connected with the to-be-connected device, wherein the card adapter may include a switch for switching between a write/delete enable state and a write/delete disable state, and the card adapter may have a function of transmitting information indicating the status of the switch to the card via the signal terminal.

The card-type peripheral device may further include a card adapter capable of being connected with the terminal part and capable of being connected with the to-be-connected device, the card adapter may include a switch for switching between a write/delete enable state and a write/delete disable state, and the card adapter may have a function of transmitting information indicating the status of the switch to the card via the signal terminal, and, if the controller receives, via the signal terminal, information indicating that the switch of the card adapter is in the write/delete disable state, the controller may control the card so that writing/deleting is disabled.

The card adapter may have a mechanism adapted to prevent the card inserted in the card adapter from being pulled out.

As described above, the present invention provides the advantage that the card-type peripheral device is realized in a small form and has the switch for disabling writing/deleting of information to/from the card, and further has a function of providing information indicating the status of the switch to the outside thereby allowing the host device to handle the card in an efficient manner.

BRIEF DESCRIPTION OF THE DRAWINGS

FIGS. 1A and 1B are diagrams provided for an explanation of outside dimensions of a card according to an ExpressCard standard;

FIG. 4A is a perspective view of the card-type peripheral device viewed from a first surface side thereof, while FIG. 4B is a perspective view of the card-type peripheral device viewed from a second surface side thereof;

FIG. 5 is a diagram showing pin assignments according to an ExpressCard standard;

FIG. 17 is a diagram provided for an explanation of a manner in which a card is inserted into a card adapter; and FIG. 18A is a diagram illustrating a card adapter with a standard length, and FIG. 18B is a diagram illustrating a card adapter with an extended length.

DESCRIPTION OF THE PREFERRED EMBODIMENTS

Embodiments of the present invention are described below with reference to the accompanying drawings.

Figure 2A:
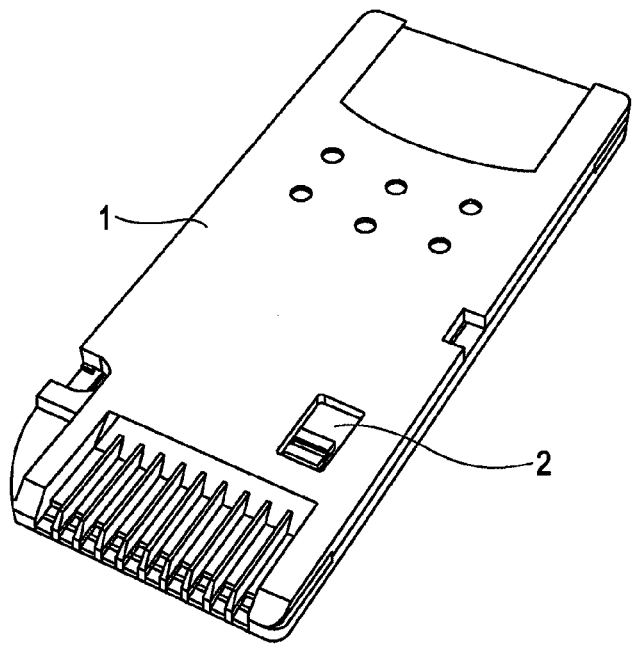
FIGS. 2A and 2B are diagrams illustrating an example of a memory card including a write/delete protection switch.
Figure 2B:
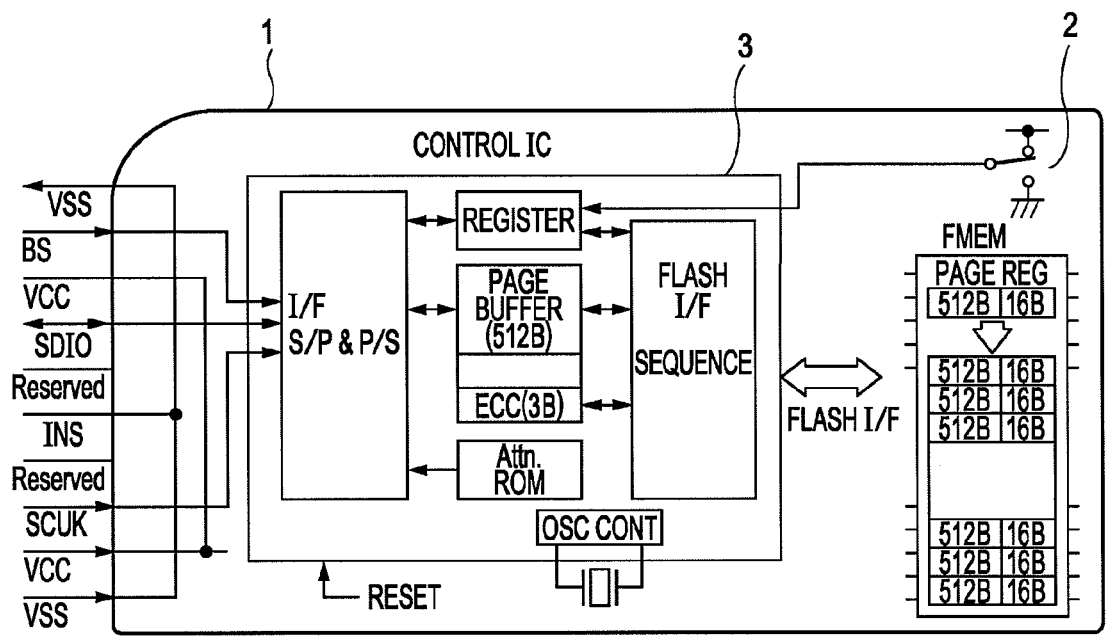
Figure 3B:
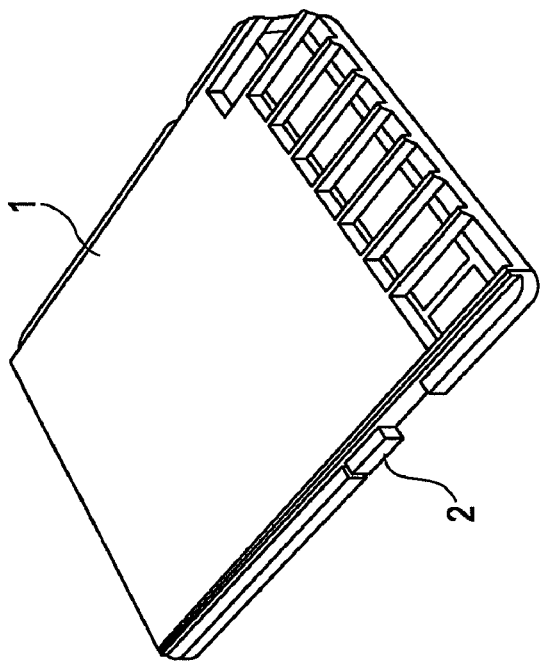
FIGS. 3A and 3B are diagrams illustrating an example of a memory card having a switch whose status is detectable by a connector.
Figure 3A:
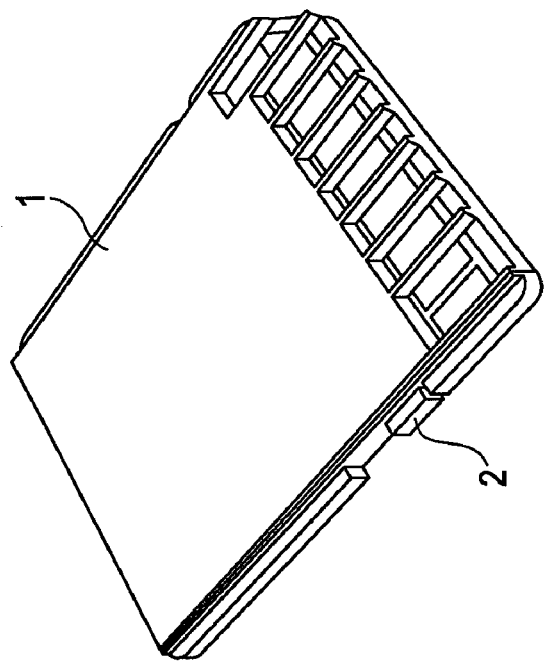
Figure 4A:
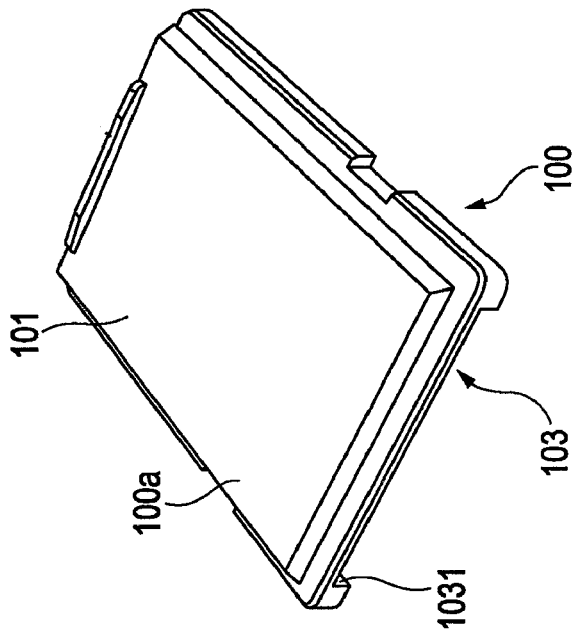
FIGS. 4A and 4B are perspective views of a card-type peripheral device functioning as a memory card according to an embodiment of the present invention, and more particularly.
Figure 4B:
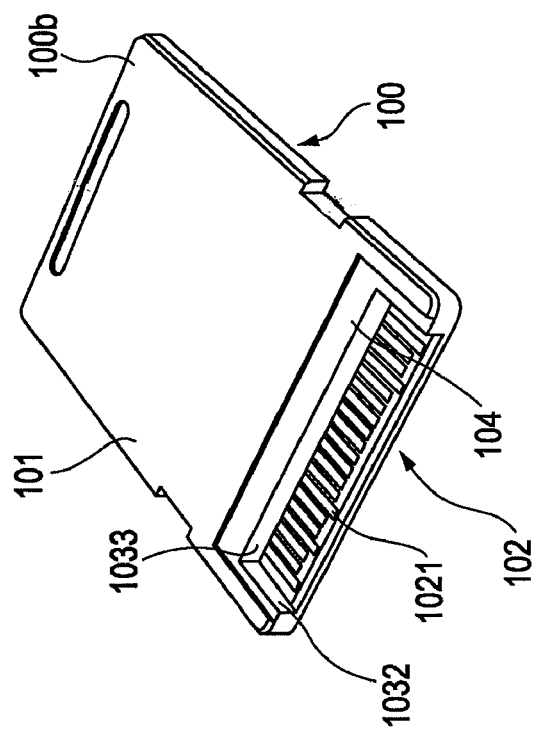

FIGS. 4A and 4B are perspective views illustrating an outward appearance of a card-type peripheral device according to an embodiment of the present invention, and more specifically, FIG. 4A is a perspective view of the card-type peripheral device viewed from a side of a first surface thereof, while FIG. 4B is a perspective view of the card-type peripheral device viewed from a side of a second surface thereof.

First, an overview is given of a characteristic configuration and functions of the card-type peripheral device (a memory card and an adapter) 100 according to the present embodiment.

The card-type peripheral device 100 according to the present embodiment is implemented in the form of a PC card medium that directly uses PCI Express or USB as an interface, and that includes a nonvolatile memory disposed therein whereby the PC card medium functions as a memory card adapted to store/read data via the interface. The card-type peripheral device 100 is configured so as to serve as a small-size high-capacity memory card usable as a removable storage medium for a high-performance mobile device such as a video camera, a digital still camera, etc. To this end, the memory card has functions and the number of pins compatible with those for the above-described use. The card-type peripheral device 100 is configured to be smaller in outside dimensions than a standard PCI ExpressCard medium so that the card-type peripheral device can be used in a small-size device. The card-type peripheral device 100 is configured to be greater in outside dimensions than commercially available small-size memory cards (such as a memory stick (registered trademark) or an SD Card®. The card-type peripheral device 100 has a switch for disabling storing (writing) of data to the small-size memory card and also has a signal terminal for notifying the host device of the status of the switch. The card-type peripheral device 100 has a card adapter that allows the small-size memory card to be used in a device adapted for use with an ExpresCard medium. The adapter has a switch for disabling writing data to the memory card, and the adapter has a function of transmitting information indicating the status of the switch on the adapter to the card via the switch status signal terminal thereby to allow the card to internally control the operation thereof so that writing is disabled. In the present embodiment, the ExpressCard conversion adapter has a function of locking the small-size card inserted in the adapter thereby to prevent the small-size card from unexpectedly popping out of the adapter or from being easily pulled out.

Further referring to FIGS. 4A and 4B, the outer configuration of the card-type peripheral device 100 is described more specifically below. The card-type peripheral device 100 shown in FIGS. 4A and 4B is adapted to function, for example, as a memory card.

In this memory card 100, a card case 101 is formed between a first surface 100*a* and a second surface 100*b* opposing to the first surface 100*a*. The card case 101 has a form of a box located on the first surface 100*a*.

A terminal part 102 including terminals 1021 arranged in a line is formed in a front end portion of the second surface 100*b*. The terminal part 102 allows the memory card 100 to receive electric power and transmit/receive data via contact pins of a connector disposed on the host device (not shown). Note that in FIGS. 4A and 4B, the memory card 100 is in a basic state in which a terminal cover is not placed on the terminal part 102.

The front end portion of the second surface 100*b* is recessed toward the first surface 100*a* so as form a recess 103, and the terminal part 102 is located on the bottom of this recess 103 such that the terminal part 102 is exposed to the outside via the recess 103. The recess 103 is surrounded by side walls 1031 and 1032 that are formed on respective sides of the terminal part 102 and by a side wall 1033 that is formed at a rear end of the terminal part 102 such that the side walls 1031, 1032, and 1033 function as partition walls. Furthermore, on the second surface 100*b*, a terminal cover receiving part 104 is formed such that a terminal cover described later is allowed to be fitted therein. The terminal cover receiving part 104 is configured in the shape of a step recessed from the second surface 100*b* into the inside of the card to a depth substantially equal to the thickness of the terminal cover such that the terminal cover in the form of a thin plate can be fitted in the terminal cover receiving part 104 in such a manner that one surface of the terminal cover is flush with the second surface 100*b*.

As described above, the memory card 100 according to the present embodiment has the interface according to the ExpressCard standard.

FIG. 5 shows pin assignments according to the ExpressCard standard.

The ExpressCard standard specifies that a card has 26 terminals in total, as shown in FIG. 5. In the memory card 100 serving as the small-size peripheral device according to the present embodiment, to achieve a reduction in size, terminals are eliminated that are not used when the ExpressCard is used as a memory card. For examples, pins 5 and 6 are reserved, and there are no functions currently assigned to these pins. Thus the pins 5 and 6 can be eliminated. Furthermore, pins 7 and 8 and pins 11 and 12 are not necessary for use as the memory card, and thus they can be eliminated. Pins 1, 2, 3, and 4 are not for the Express interface but for the USB interface, and these pins are not necessary when the card is used as a usual memory card. These pins may remain for complementary use, for example, in a legacy card adapter or the like. In view of the above, the total of 26 pins can be reduced to 16 to 20 pins.

In the memory card 100 according to the present embodiment, a write/delete protection switch is formed on an upper surface, a lower surface, or a bottom surface of the card.

Figure 6B:
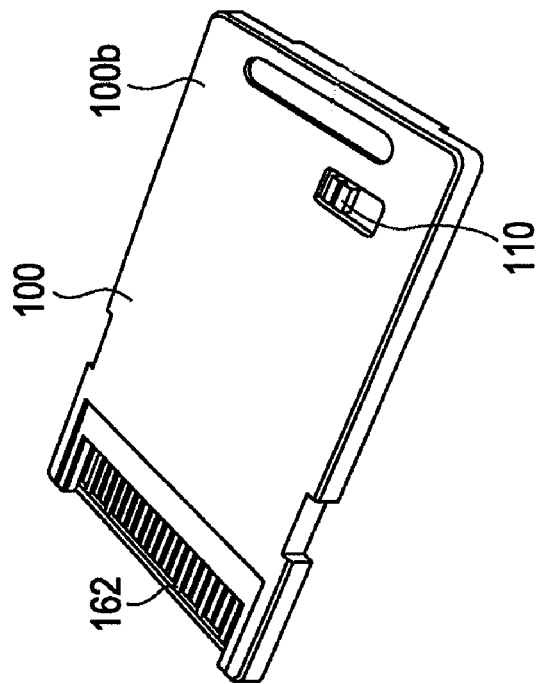
FIGS. 6A and 6B are diagrams showing examples of manners in which a write/delete protection switch is formed in a card-type peripheral device according to an embodiment of the present invention.
Figure 6A:
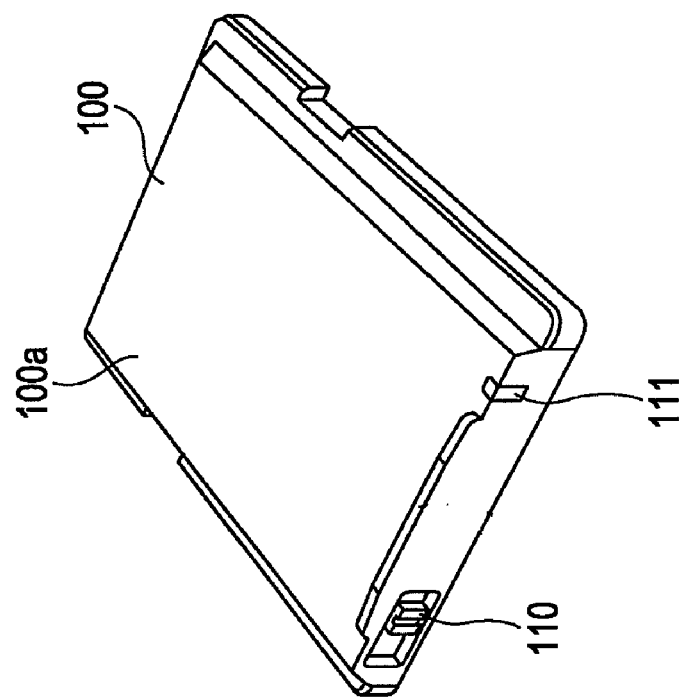

FIGS. 6A and 6B show examples of manners in which the write/delete protection switch is formed in the memory card (the card-type peripheral device) according to the present embodiment.

In the example shown in FIG. 6A, the write/delete protection switch 110 is formed on an end face of a rear end part of the memory card 100. An access lamp 111 is also disposed on the end face of the rear end part of the memory card 100.

In the example shown in FIG. 6B, the write/delete protection switch 110 is formed on the second surface 101*b*, at a location close to the rear end, of the memory card 100.

Figure 7:
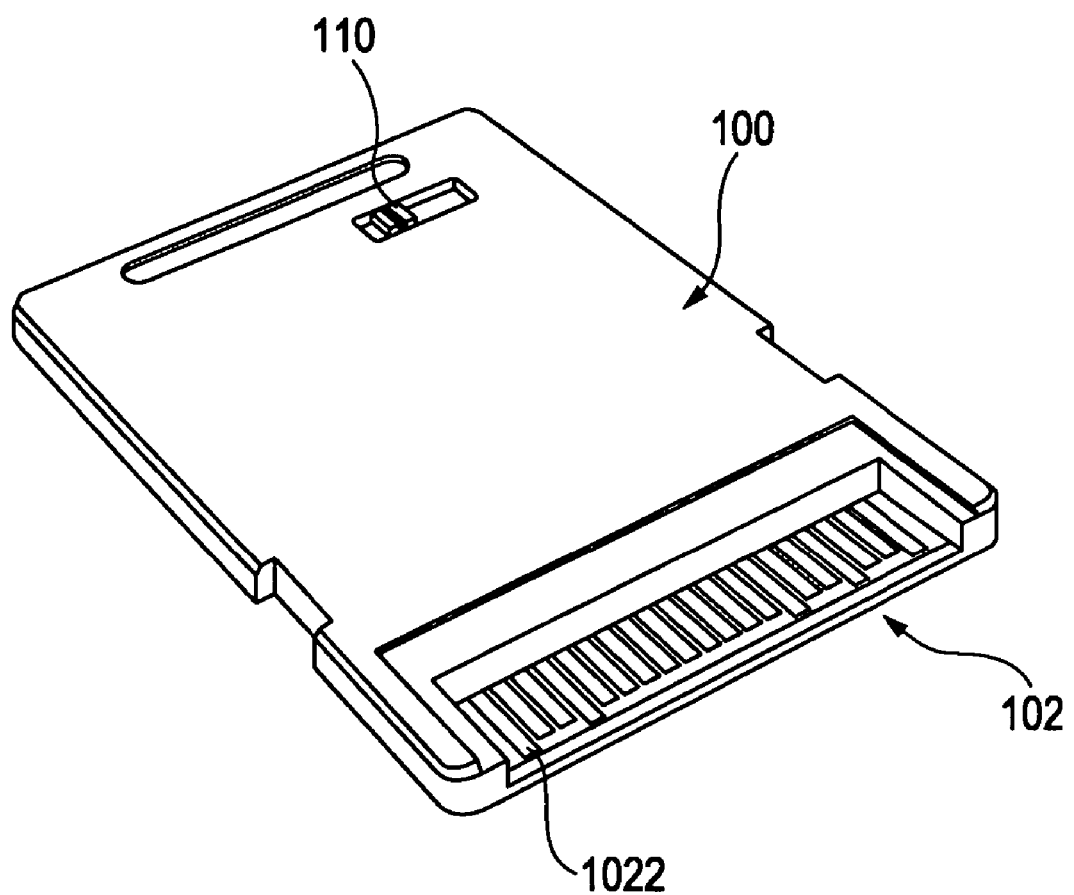
FIG. 7 is a diagram illustrating an example of a location at which a write disable signal terminal is formed.
Figure 8A:
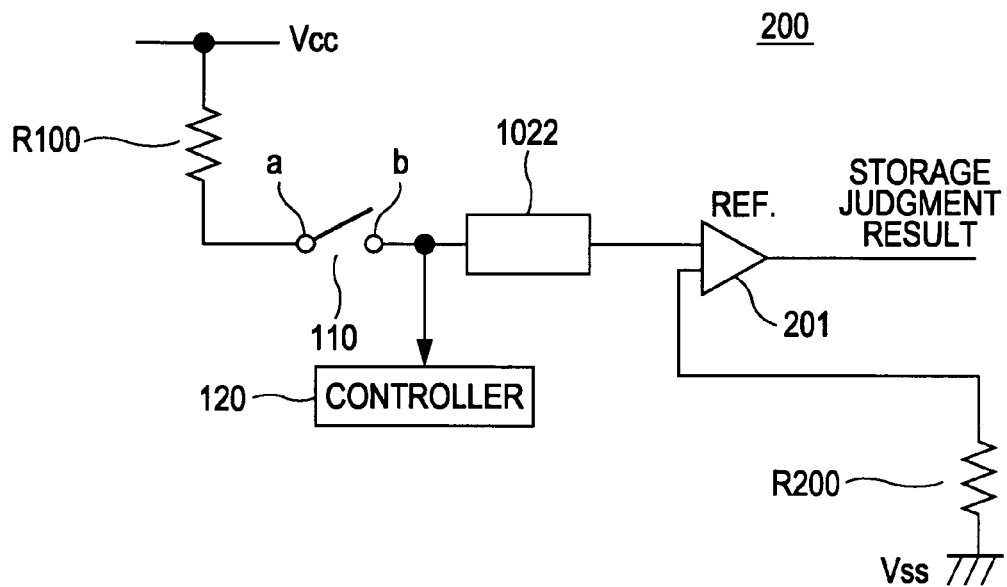
FIGS. 8A and 8B are circuit diagrams illustrating examples of control systems including a write disable signal terminal and a write/delete protection switch.
Figure 8B:
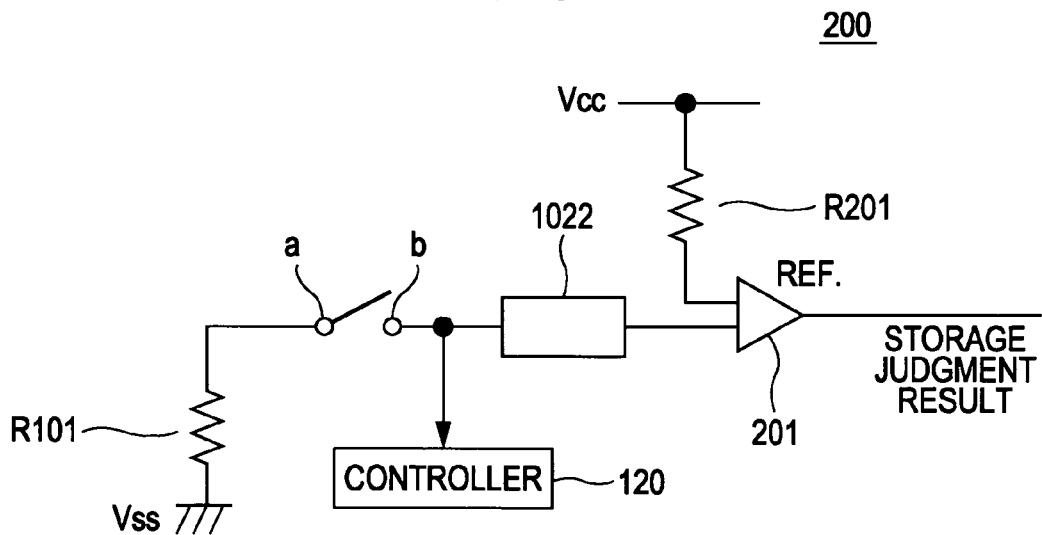

In the card-type peripheral device 100 according to the present embodiment, as shown in FIG. 7, of a plurality of terminals 1021 arranged in the terminal part 102, at least one terminal 1022 is assigned for use to supply information to the host device or the adapter to notify whether writing is enabled or disabled. That is, the terminal 1022 functions as a write disable signal terminal. The write disable signal terminal 1022 is usually in a high impedance (Hi-Z) state. The switch 110 disposed on the card is switchable between a write/delete enable position and a write/delete disable position. FIGS. 8A and 8B illustrate examples of control systems including the write disable signal terminal and the write/delete protection switch.

In the example shown in FIG. 8A, a fixed contact "a" of the switch 110 is connected to a power supply voltage Vcc via a resistor R100, while an operating contact "b" is connected to a controller 120 and the signal terminal 1022. The signal terminal 1022 is connected, for example, to one terminal of a comparator 201 of a host device 200. The other terminal of the comparator 201 is connected to a reference voltage Vss (for example, a ground voltage) via a resistor R200. In the example shown in FIG. 8B, the fixed contact "a" of the switch 110 is connected to the reference voltage Vss (for example, the ground voltage) via a resistor R101, while the operating contact "b" is connected to the controller 120 and the signal terminal 1022. The signal terminal 1022 is connected to, for example, one terminal of the comparator 201 of the host device 200. The other terminal of the comparator 201 is connected to the power supply voltage Vcc via a resistor R201.

In the control system configured in either one of the examples described above, if the switch 110 is changed over to the write/delete disable position, the controller 120 of the memory card 100 controls the operation of the card 100 so that writing/deleting of information to/from the card 100 is disabled. At the same time, the controller 120 connects the signal terminal 1022 to a common level (ground level). When this card is inserted into the host device 200, the host device 200 first detects the card and then detects the status of the signal terminal 1022. Because the other terminal of the comparator 201 serving as a detection circuit in the host device 200 is pulled up or pulled down, if the switch 110 is in the write disable position, then the voltage is at the common level (ground level), and thus it is detected that the switch 110 is in the write disable position.

Thus, the host device does not try to send a delete command to the card, and thus an improvement in efficiency of the process can be achieved. Even if, by some chance, the delete command is sent to the card, a signal indicating that the card is internally in the write/delete disable state is sent to the host device thereby achieving high reliability in preventing information from being deleted erroneously. The signal terminal 1022 disposed on the card is also capable of receiving data. That is, when the switch is in the write enable state, the signal terminal 1022 can be used to detect a signal supplied from the outside.

The card-type peripheral device according to the present embodiment has been described above assuming that the card-type peripheral device is used as a memory card. Next, an example of a configuration of the card-type peripheral device is described below for a case where the card-type peripheral device is used in a state in which it is connected to a card adapter according to an embodiment.

Figure 9:
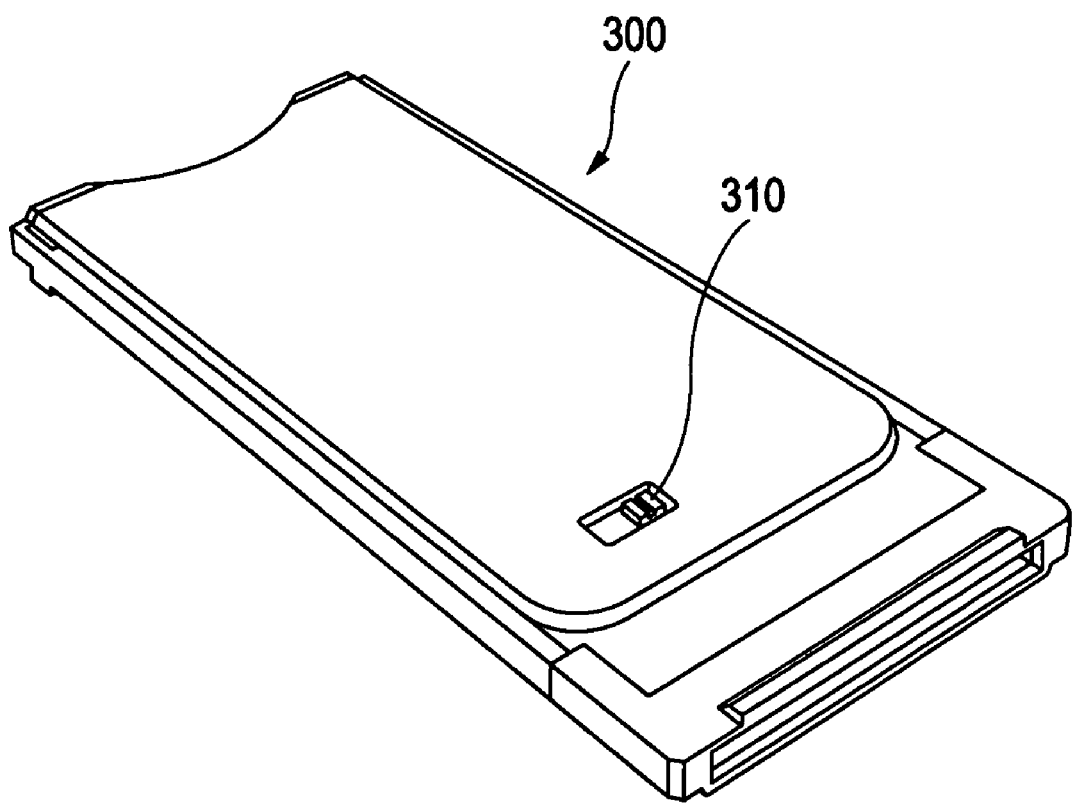
FIG. 9 is a diagram illustrates an example of a switch-equipped card adapter.

FIG. 9 illustrates an example of a switch-equipped card adapter.

This card adapter 300 has a write/delete enable/disable changeover switch 310.

Figure 10:
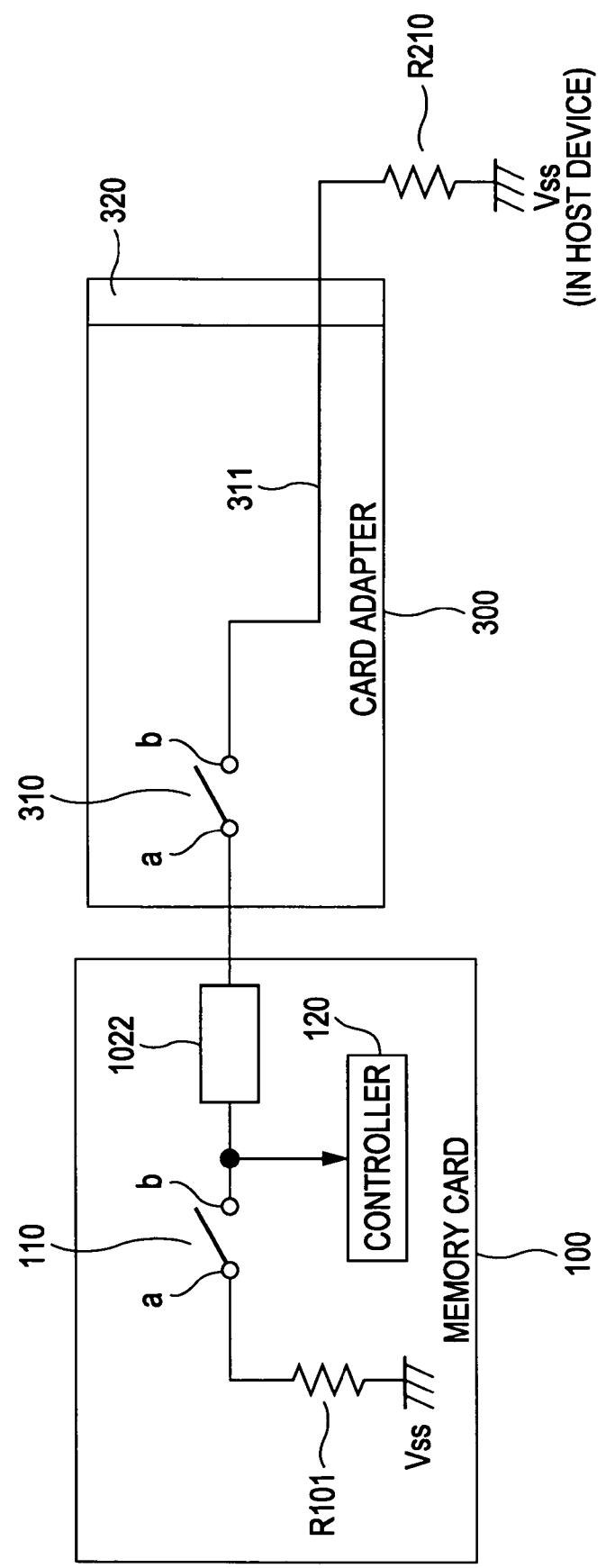
FIG. 10 illustrates an example of a circuit configuration of a switch part in a card adapter and a switch part in a card, for a case where the switch in the card adapter is in an off-state.
Figure 11:
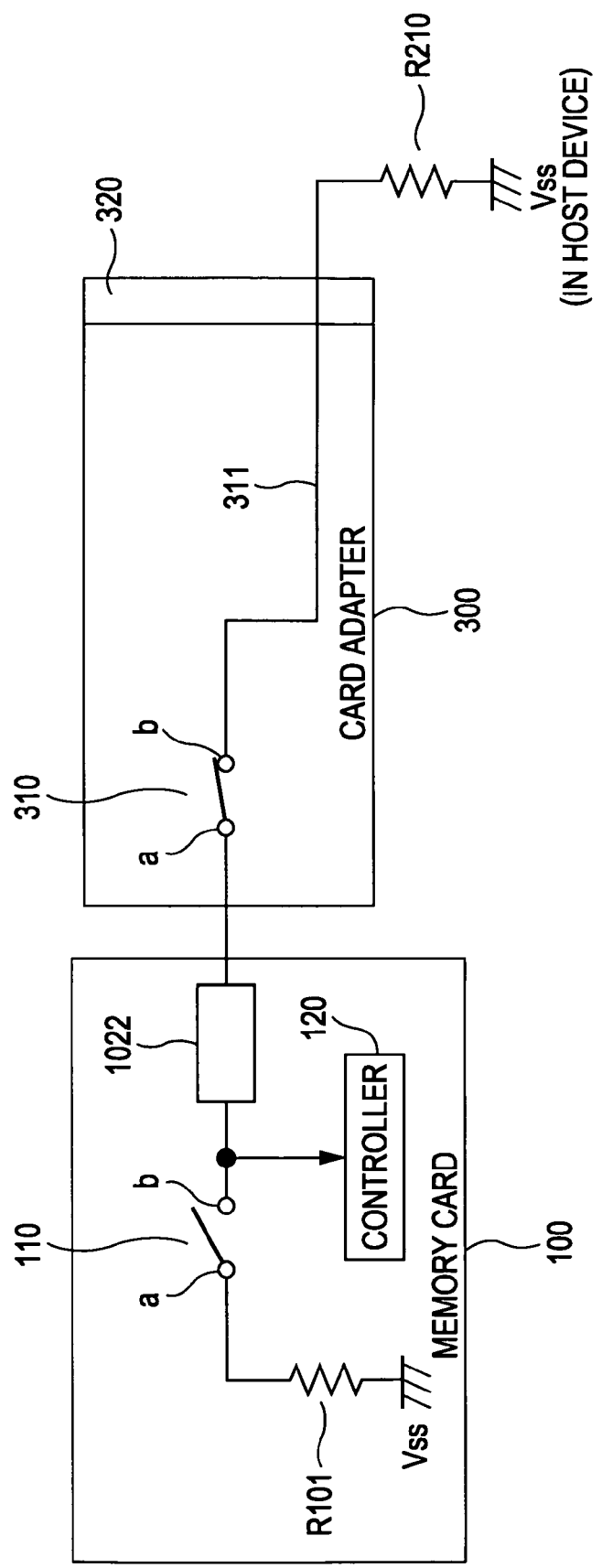
FIG. 11 illustrates an example of a circuit configuration of a switch part in a card adapter and a switch part in a card, for a case where the switch in the card adapter is in an on-state.

FIGS. 10 and 11 show examples of circuit configurations of the switch part in the card adapter and the switch part in the card. In the example shown in FIG. 10, the switch in the card adapter is in an off-state, while in the example shown in FIG. 11, the switch in the card adapter is in an on-state.

The memory card 100 has a circuit configuration equivalent to that shown in FIG. 8B. The card adapter 300 is configured such that a fixed contact "a" of a switch 310 is connected to the signal terminal 1022 of the memory card 100, and an operating contact "b" is connected to a reference voltage Vss via a Vss signal line 311 in the card interface, a connector 320, and a resistor R210 of the host device.

As shown in FIG. 10, in a case where the switch 310 on the card adapter 300 is in the write enable position, the terminal in the adapter 300 is not connected anywhere, and thus the controller 120 in the memory card 100 detects that the memory card 100 is in the write enable state.

On the other hand, when the switch 310 of the card adapter 300 is in the write disable position, the terminal in the adapter is connected to the ground level, and thus the controller 120 in the memory card 100 controls the memory card 100 such that writing/deleting is disabled.

Figure 12:
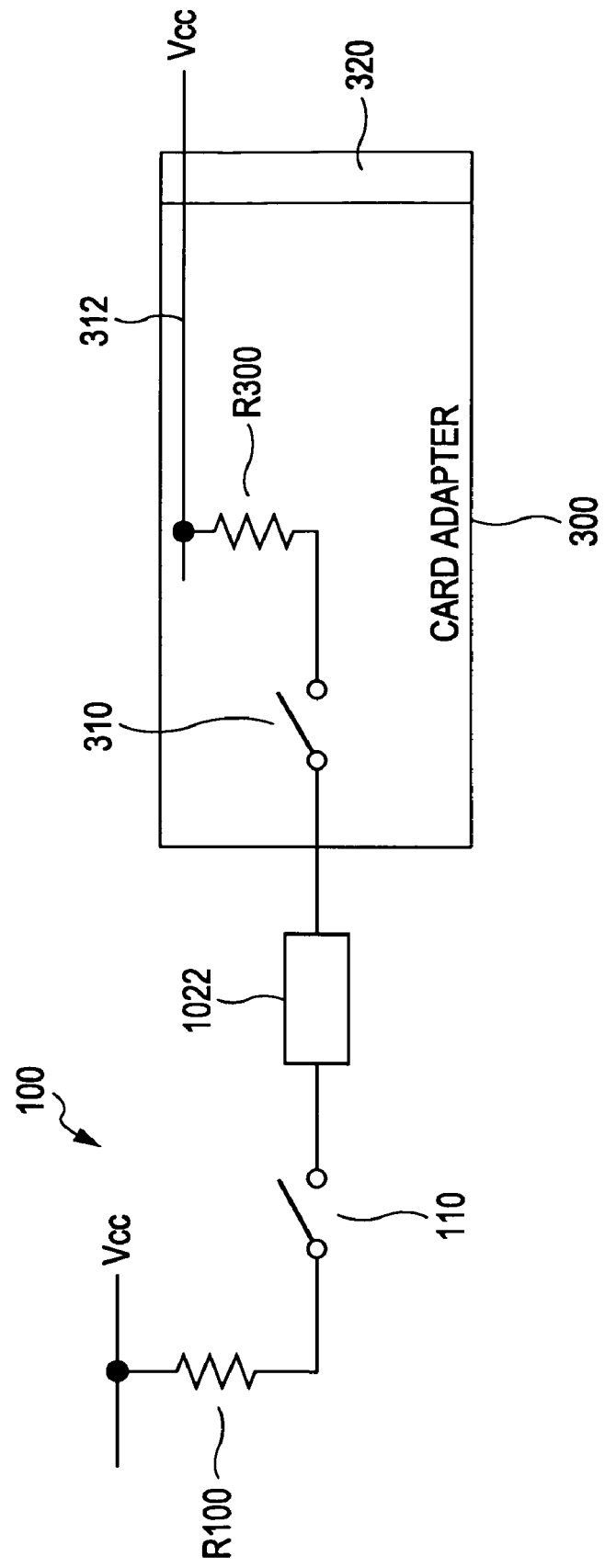
FIG. 12 illustrates an example of a circuit configuration of a switch part in a card adapter and a switch part in a card.

FIG. 12 illustrates another example of a circuit configuration of the switch part in the card adapter and the switch part in the card.

The memory card 100 has a circuit configuration equivalent to that shown in FIG. 8A. The card adapter 300 is configured such that a fixed contact "a" of a switch 310 is connected to the signal terminal 1022 of the memory card 100, while the operating contact "b" is connected to the Vcc signal line 312 of the card interface via a resistor R300 and further to the power supply voltage Vcc of the host device via a connector 320. Also in this configuration, the basic operation is similar to that of the previous example, although the switch in the card and the switch in the adapter are connected differently.

By employing one of the configurations described above, the status of the write/delete protection switch disposed in the adapter for conversion to a large-size card is reflected in the function of the write/delete protection switch operable independently in the small-size memory card. In the examples described above, it is assumed that the interface is converted by the adapter to an interface similar to that of the small-size card. However, it is not necessary that the interface be converted to a similar one.

Figure 13:
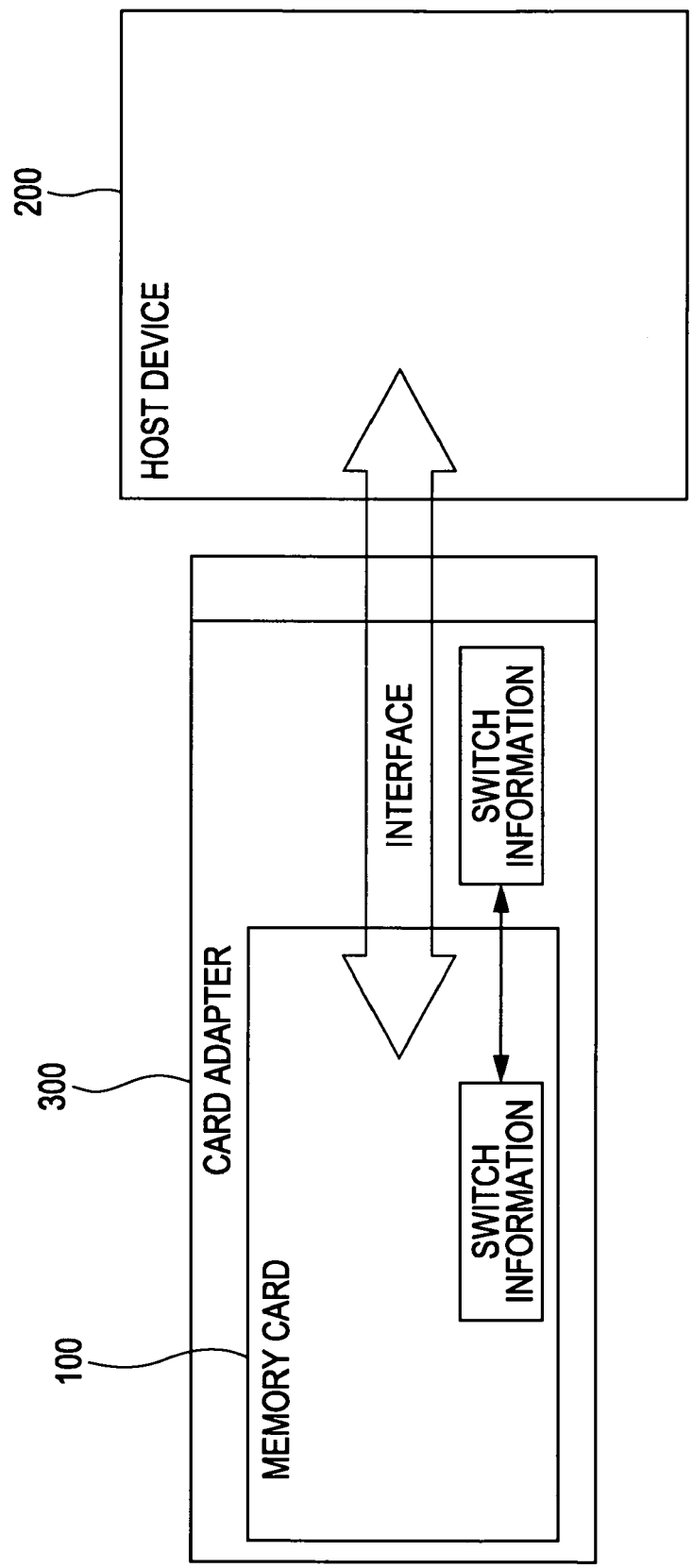
FIG. 13 is a diagram illustrating an example of a configuration in which a card and a host device use the same interface.
Figure 14:
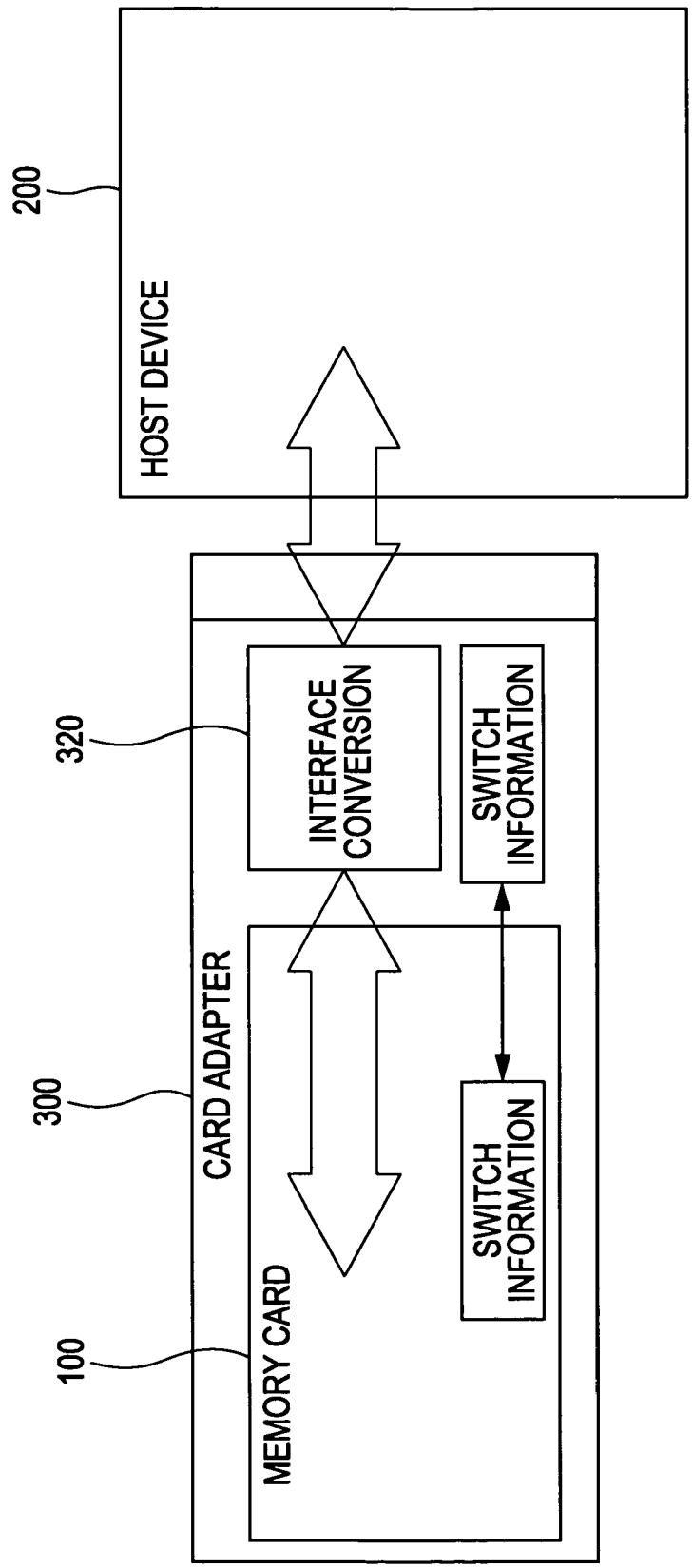
FIG. 14 is a diagram illustrating an example of a configuration in which a card and a host device use different interfaces.

In a case where the interface is the same for the card and the host device, the card adapter 300 directly transfers information to the host device 200 other than information associated with the switch, as shown in FIG. 13. On the other hand, in a case where the interface is different for the card and the host device, the card adapter 300 has a circuit 320 that converts the interface. In this case, as shown in FIG. 14, information indicating whether the write/delete is enabled or disabled is transmitted only between the card and the adapter without being transmitted to the host device, and the host device can use the card without concern for this information.

In some applications, once the card is inserted into the card adapter 300, the card is maintained in the adapter for a long period without being pulled out of the adapter. For convenience in use in such applications, a card stopper mechanism may be disposed on the card adapter 300 thereby to prevent the card inserted in the card adapter 300 from being easily pulled out or from popping out due to an external factor such as a shock.

Figure 15:
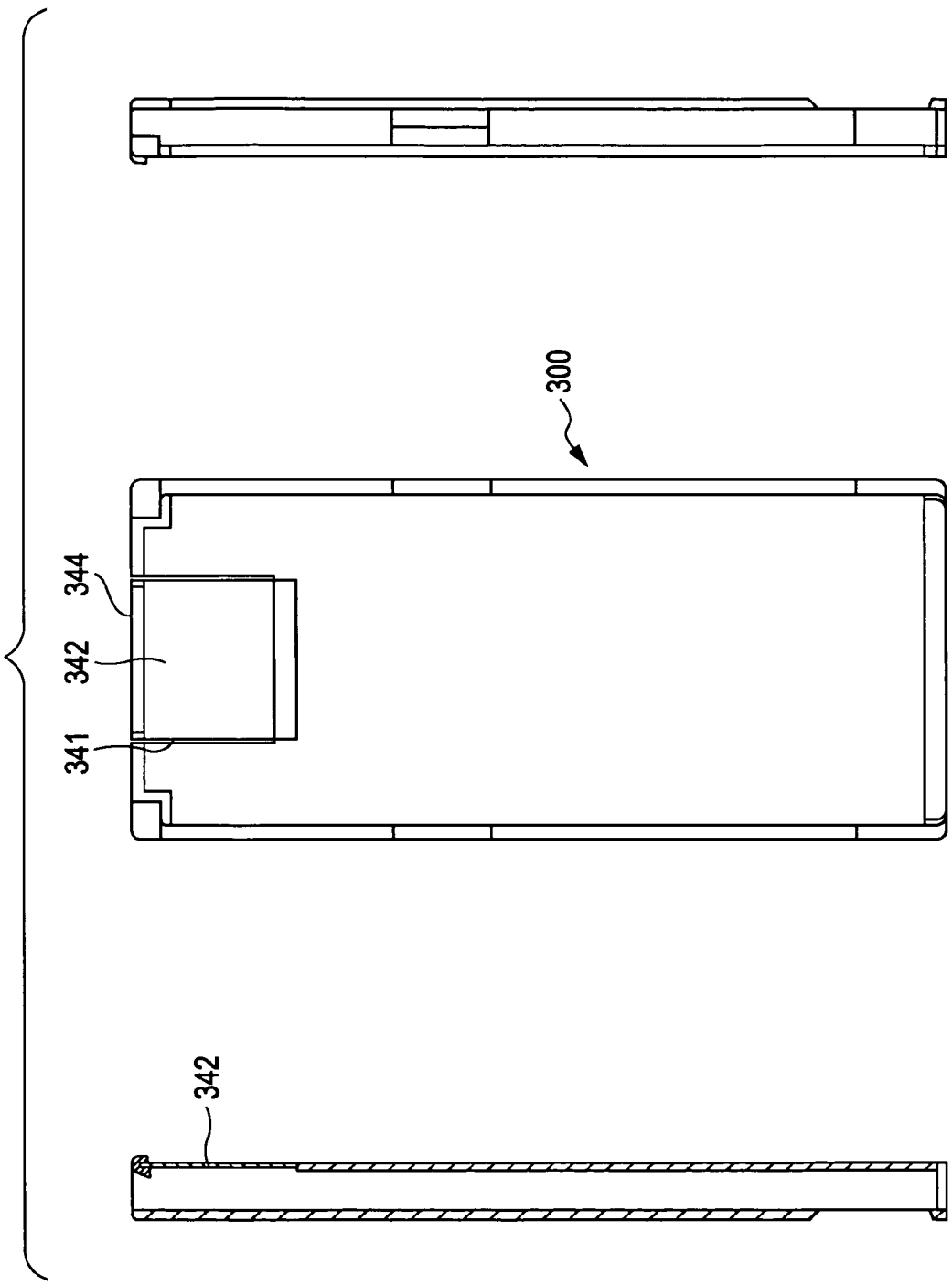
FIG. 15 shows a plan view, a side view, and a cross-sectional view of a card adapter having a card stopper mechanism.
Figure 16:
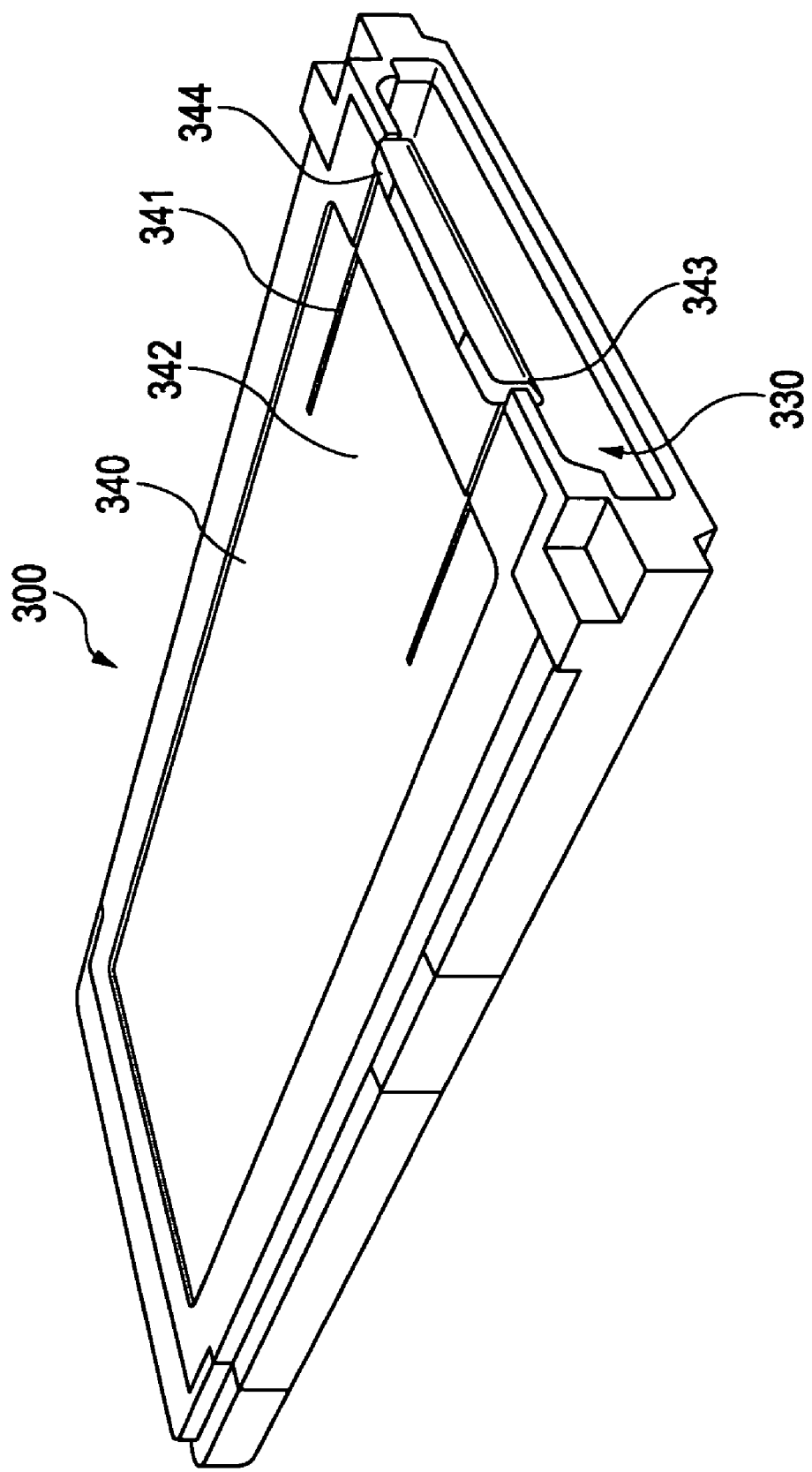
FIG. 16 shows a perspective view of a card adapter having a card stopper mechanism.

FIGS. 15 and 16 show an example of a card adapter having a card stopper mechanism, and more specifically, FIG. 15 shows a plan view, a side view, and a cross-sectional view thereof, and FIG. 16 shows a perspective view thereof.

In this example, a plate spring 342 made of an elastic material is disposed at the top of a region of a card insertion slot 330 of the card adapter 300 such that the plate spring 342 is isolated by slits 341 from an upper surface 340 of the card adapter 300. The insertion slot 330 has a guide/stopper part 343 whose lower surface is gradually tapered in a direction toward the center of the insertion slot, and the plate spring 342 has a notch 344 formed at a location close to the guide/stopper part 343.

FIG. 17 is a diagram illustrating a manner in which the card is inserted into the card adapter.

As shown in FIG. 17, when the memory card 100 is inserted, the leading end thereof is first brought into contact with the guide/stopper part 343. If the memory card 100 is further pushed inward, the memory card 100 moves into the inside of the card adapter 300 while being guided by the guide/stopper part 343. During this process, the guide/stopper part 343 is pushed up by the card surface and thus the plate sprint 342 receives force in an upward direction as shown in the figure. As a reaction, force weaker than card insertion force is applied to the guide/stopper part 343 from the plate spring 342 in a downward direction as seen in the figure. Thus, the memory card 100 is inserted stably while being guided by the guide/stopper part 343 applying the force to the memory card 100. When the memory card 100 is completely inserted, the rear end of the memory card 100 is partially locked by the guide/stopper part 343 thereby to prevent the memory card 100 from being easily pulled out. To pull out the memory card 100, the notch 344 of the plate spring 242 is pushed up so as to create a pull-out path via which the memory card 100 is allowed to be pulled out. Thereafter, if the memory card 100 is pulled outward, the memory card 100 moves outward in a direction opposite to the direction in which the memory card is inserted, while being guided by the guide/stopper part 343.

The card adapter of this type may be slightly greater in length than the card adapters of the previous examples, as shown in FIG. 18A and FIG. 18B.

In the embodiment of the present invention, as described above, the small-size memory card is realized, which can transfer data at a very high rate and which has the switch 110 for disabling writing/deleting of information to/from the card. The memory card has the function of providing information indicating the status of the switch to the outside thereby allowing the host device 200 to handle the card in an efficient manner. The switch functioning in a similar manner may be disposed on the card adapter 300 adapted to convert the card size and/or the interface, and the status of this switch can be reflected in the operation of the card.

For convenience in use where the card is maintained in the adapter for a long period without being pulled out of the adapter, the card stopper mechanism may be disposed on the card adapter thereby to prevent the card inserted in the card adapter from being easily pulled out.

It should be understood by those skilled in the art that various modifications, combinations, sub-combinations and alterations may occur depending on design requirements and other factors insofar as they are within the scope of the appended claims or the equivalents thereof.

What is claimed is:

1. Apparatus comprising:
    a card-type peripheral device comprising:
        an electronic component including a memory disposed in a case,
        a terminal part including connection terminals connectable with a to-be-connected device,
        a first switch for disabling writing to the memory, and
        a signal terminal capable of transmitting a signal indicating the status of the first switch to the to-be-connected device; and
    a card adapter capable of being connected with the terminal part and capable of being connected with the to-be-connected device, the card adapter comprising a second switch capable of being electrically coupled to the card-type peripheral device for disabling writing to the memory of the card-type peripheral device;
    wherein when the first switch is in a write enable position and the second switch is in a write disable position while the second switch is coupled to the card-type peripheral device, writing to the memory is disabled.

2. The apparatus according to claim 1, wherein a function of the electronic component and a number of terminals of the terminal part are maintained to be compatible with those of the to-be-connected device.

3. The apparatus according to claim 1, wherein the signal terminal is realized by one of the connection terminals of the terminal part.

4. The apparatus according to claim 3, wherein the electronic component includes a controller adapted to control operation of the electronic component so as to disable writing of information to the memory and deleting of information stored in the memory depending on a status of the first or second switch.

5. The apparatus according to claim 4, wherein:
    the card adapter has a function of transmitting information indicating a status of the second switch to the card-type peripheral device via the signal terminal, and
    if the controller receives, via the signal terminal, information indicating that the second switch of the card adapter is in a write/delete disable state, the controller controls the card-type peripheral device so that writing/deleting is disabled.

6. The apparatus according to claim 5, wherein the card adapter has a mechanism adapted to prevent the card-type peripheral device inserted in the card adapter from being easily pulled out.

7. The apparatus according to claim 5, wherein the card adapter comprises a box-shaped space in which the card-type peripheral device can be inserted.

8. The apparatus according to claim 4, wherein the controller controls a level of the signal terminal depending on the status of the first switch.

9. The apparatus according to claim 3, wherein the card adapter has a function of transmitting information indicating a status of the second switch to the card-type peripheral device via the signal terminal.

10. The apparatus according to claim 1, wherein the card adapter has a mechanism adapted to prevent the card-type peripheral device inserted in the card adapter from being easily pulled out.

11. The apparatus according to claim 1, wherein the card adapter comprises a box-shaped space in which the card-type peripheral device can be inserted.

12. Apparatus comprising:
    a card-type peripheral device comprising:
        an electronic component including a memory disposed in a case,
        a terminal part including connection terminals connectable with a to-be-connected device, and
        a first switch for disabling writing to the memory; and
    a card adapter capable of being connected with the terminal part and capable of being connected with the to-be-connected device, the card adapter comprising a second switch capable of being electrically coupled to the card-type peripheral device for disabling writing to the memory of the card-type peripheral device;
    wherein:
        when the first switch is in a write enable position and the second switch is in a write disable position while the second switch is coupled to the card-type peripheral device, writing to the memory is disabled.

13. The apparatus according to claim 12, wherein the card adapter comprises a box-shaped space in which the card-type peripheral device can be inserted.

14. The apparatus according to claim 12, wherein the card adapter has a mechanism adapted to prevent the card-type peripheral device inserted in the card adapter from being easily pulled out.

15. The apparatus according to claim 12, wherein, when the first switch is in a write disable position and the second switch is in a write enable position while the second switch is coupled to the card-type peripheral device, writing to the memory is disabled.

16. The apparatus according to claim 1, wherein when the first switch is in a write disable position and the second switch is in a write enable position while the second switch is coupled to the card-type peripheral device, writing to the memory is disabled.

* * * * *